United States Patent [19]

Niewiera

[11] 4,261,160
[45] Apr. 14, 1981

[54] WEED REMOVAL APPARATUS

[76] Inventor: Joseph J. Niewiera, 3 Federal Hill Rd., Apt. #35, Auburn, Mass. 01501

[21] Appl. No.: 85,053

[22] Filed: Oct. 15, 1979

[51] Int. Cl.³ .......................................... A01D 44/00
[52] U.S. Cl. ............................................. 56/8; 56/9
[58] Field of Search ....................................... 56/8-9; 37/55

[56] References Cited

U.S. PATENT DOCUMENTS

| 978,968 | 12/1910 | Webb | 37/55 |
|---|---|---|---|
| 1,120,206 | 12/1914 | Knapp | 56/9 |
| 1,571,395 | 2/1926 | Clark | 56/9 |
| 2,204,584 | 6/1940 | Flower | 37/55 |
| 2,907,162 | 10/1959 | Rebikoff | 56/9 |
| 3,197,949 | 8/1965 | Waag | 56/202 |
| 3,546,858 | 12/1970 | Chaplin | 56/9 |
| 3,578,171 | 5/1971 | Usher | 210/242 |
| 3,596,444 | 8/1971 | Beattle | 56/9 |
| 3,626,675 | 12/1971 | Chaplin | 56/9 |
| 3,691,737 | 9/1972 | Hodgson | 56/9 |
| 3,866,396 | 2/1975 | Meyer | 56/9 |
| 3,878,669 | 4/1975 | Chaplin | 56/9 |

Primary Examiner—Paul J. Hirsch
Attorney, Agent, or Firm—Norman S. Blodgett; Gerry A. Blodgett

[57] ABSTRACT

Apparatus for weed removal from a pond, the apparatus including a buoyant raft, a vacuum pickup hose, and a collecting means.

5 Claims, 3 Drawing Figures

WEED REMOVAL APPARATUS

BACKGROUND OF THE INVENTION

A serious ecological problem that has arisen recently is that of the proliferation of weed growth in fresh water ponds. This problem has occurred because both of the conventional methods of removing weeds leads to a vicious circle that results in ever-increasing weed growth. One method that is presently used in controlling weeds is that of introducing into the pond a floating machine which cuts the weeds in the manner of a lawn mower. A portion of the weed which is cut eventually falls to the bottom where it forms a rich fertilizer for further growth of weeds. The other conventional method is the use of chemicals. In this case the chemical causes the weed to die, but the dead weed simply falls to the bottom of the pond where it forms an excellent fertilizer for further weed growth. In addition, chemical weed killing is gradually being banned in most communities, because of the fact that the weed-killing chemicals contain heavy metal which, when introduced into the water table, tend to poison water supplies. In addition, these chemicals are difficult to remove from the water once they have been introduced. These and other difficulties experienced with the prior art devices have been obviated in a novel manner by the present invention.

It is, therefore, an outstanding object of the invention to provide an apparatus for removing weeds from lakes and ponds by uprooting them.

Another object of this invention is the provision of weed killing apparatus which does not leave dead weeds on the pond bottom to fertilize.

A further object of the present invention is the provision of a weed removal apparatus which operates to break the weed growth cycle.

It is another object of the instant invention to provide an apparatus and method to remove weeds from a pond without introducing harmful chemicals.

A still further object of the invention is the provision of an apparatus for weed removal in which the weeds are collected and can later be used for beneficial purposes.

It is a further object of the invention to provide a weed removal apparatus which is light in weight, which is inexpensive to manufacture, and which can be readily transported from one pond to another.

It is still a further object of the present invention to provide a weed removal method which permits the operator to be very selective and to remove weeds only from the location and in the amount that he wishes.

With these and other objects in view, as will be apparent to those skilled in the art, the invention resides in the combination of parts set forth in the specification and covered by the claims appended hereto.

SUMMARY OF THE INVENTION

In general, the present invention involves an apparatus for removing weeds from the bottom of a body of water. The apparatus consists of a bouyant raft, a motor-driven pump mounted on the raft, the input of the pump receiving water from the body of water, and an ejector mounted on the raft and having a nozzle that receives water from the pump. The hose extends from the ejector to the said bottom and a tray is mounted on the raft and receives the discharge from the ejector. A collecting means is mounted on the tray to receive the weeds.

More specifically, the tray consists of a bottom and two sides and is open upwardly at the discharge end. The collecting means includes a bag formed of mesh material. A rigid bail is fastened to the discharge end of the tray and the open end of the bag is locked around the bail and the end of the tray.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
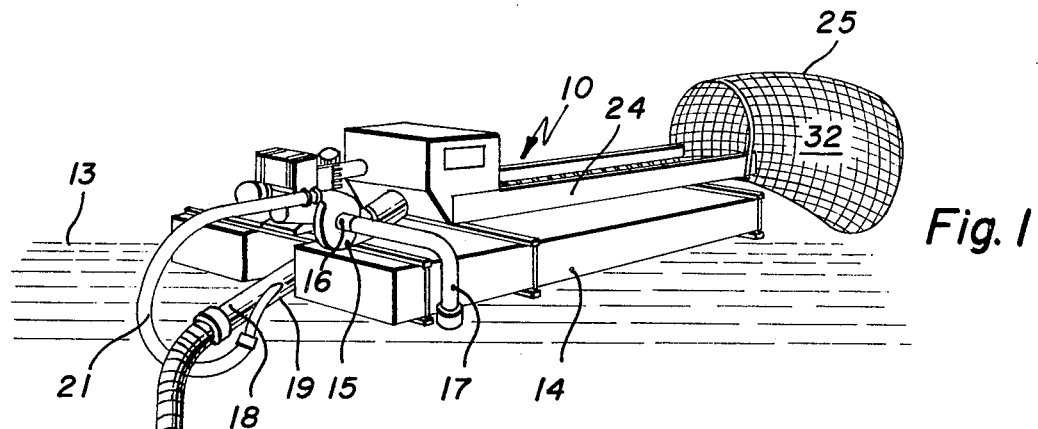
FIG. 1 is a perspective view of weed removal apparatus embodying the principles of the present invention.

Referring first to FIG. 1, wherein are best shown the general features of the invention, it can be seen that weed removal apparatus, indicated generally by the reference numeral 10, is shown as removing weeds 11 from the bottom 12 of a body 13 of water. Normally, this body of water would be a fresh water pond or lake.

The apparatus 10 is provided with a buoyant raft 14, consisting of large elongated blocks of expanded polyurethane suitably held together with rods and straps. Mounted on the upper surface of the raft is a pump 15 of the centrifical type driven by a small horsepower internal combustion engine. The input 16 of the pump is connected by a pipe 17 to the water. An ejector 18 is also mounted on the raft and has a nozzle 19 forming a venturi that receives water from the pump through a conduit 21. A hose 22, which is in the nature of a flexible corrugated hose, reaches from the ejector 18 to the bottom 12 and is provided with a pickup nozzle 23.

A tray 24 is noted on the raft 14 and receives the discharge from the ejector 18. Collecting means 25 is mounted on the tray 24 to receive the weeds 11.

Figure 2:
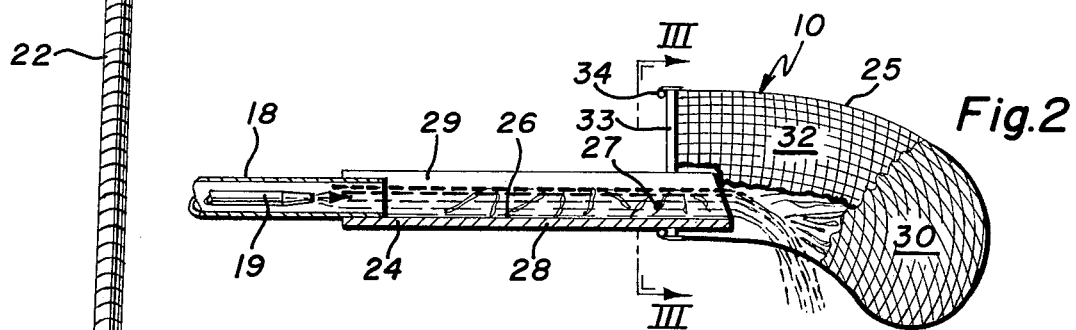
FIG. 2 is a longitudinal, vertical sectional view of the apparatus.
Figure 3:
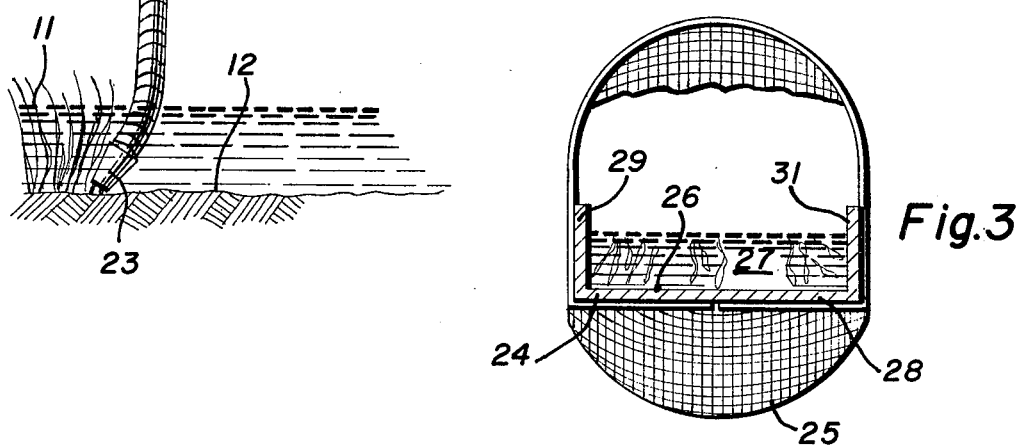
FIG. 3 is a transverse vertical sectional view of the apparatus taken on the line III—III of FIG. 2.

Referring to FIGS. 2 and 3, it can be seen that the tray is formed with a very smooth inner surface 26 in order to direct a mixture 27 of water and weeds to the collecting means 25 without inhibiting the movement of the mixture. The tray 24 is provided with a bottom 28 and two sides 29 and 31, so that it is open upwardly and at the discharge end. The collecting means 25 includes a bag 32 formed of mesh material. A rigid bail 33 is fastened to the discharge end of the tray 24 and the open end of the bag is locked around the bail and the said end of the tray. The open end of the bag is provided with an elastic element 34 that tightly locks around the bail and tray. As is evident in FIG. 3, the bail extends almost entirely around the tray, so that a locking ridge exists throughout the entire periphery of that end of the tray and provides an element against which the resilient element 34 can lock.

The operation and the advantages of the present invention will now be readily understood in view of the above description. Because the apparatus is fairly light in weight and fairly small in size, it is possible easily to transport it from one working area to another. Assuming that the raft 14 has been deposited on a fresh water pond which has weeds 11 growing from its bottom 12, the raft is free to float and to be guided over the surface.

The operator dons scuba diving gear and proceeds to dive to the bottom, carrying the hose 22 and the nozzle 23 with him. The internal combustion engine driving the pump 16 is placed in operation, of course, before he begins his descent. This means that the pump 15 is drawing water through the conduit 17 into the inlet 16 of the pump. The pump ejects the water with considerable force through the conduit 21 into the nozzle 19 of the ejector 18. This causes water to flow with similar force onto the tray 24. As a matter of fact, because of the nature of the ejector (which operates by the venturi principal), water is also drawn through the conduit 24 with considerable force. This produces a considerable suction or vacuum at the nozzle 23.

The operator then positions the nozzle 23 close to the bottom 12 and applies it to the bottom of the weed 11. The force is so strong that it pulls not only the weed, but also its roots into the conduit. The weed, along with its roots and a considerable portion of water, is carried up into the ejector. Probably, a certain amount of mud and sand will also be carried. This mixture 27 is projected onto the surface of the tray 24 and, because the inner surface 26 is so smooth and without projections or the like, the said mixture flows readily toward its rear end. At that point, the mixture flows under the bail 33 into the bag 32. The fine sand and water pass through the mesh of the bag, but the weeds themselves form a collection 30 in the bottom of the bag. The use of the elastic element 34 causes the bag to lock around the bail and a considerable body of weeds can accumulate in the bag before it is necessary to empty it. In this way, the operator can guide the nozzle 23 over the surface of the pond and gather in the weeds. It will be understood that, when the operator moves the nozzle from one place to another, the raft 14 automatically adjusts itself on the upper surface of the pond and moves along with the nozzle.

It can be seen that the present apparatus and method allows the removal of the weeds in such a way that they do not form a reinforcing and fertilizing bed on the bottom of the pond. In this way, it is possible to prevent the reinforcement of the ecological cycle which would otherwise cause more and more weeds to grow as the years pass. At the same time, no sharp stubble remains behind to lacerate swimmers feet, etc. In addition, because the roots are entirely removed, the source of new growth of weeds is interrupted, so that the whole growth cycle of the weed is interrupted in a very beneficial manner. In addition, the collection of the weeds in the basket in usable form means that a material is available for other uses, such as mulching and as fertilizer in home gardens. It is contemplated, for instance, that a municipality would collect the weeds with the present apparatus and deposit them in a collection area where they would be available to the townspeople for use in fertilizing and mulching their gardens.

It can be readily seen, therefore, that the present apparatus removes the difficulties that have been experienced in the former methods of removing weeds. It does not contaminate the body of water (as is true in a chemical process) and it does not leave the cut portions of the weeds available to re-fertilize and re-seed in accordance with the previous harvesting methods. More importantly, however, it adds a feature that none of the prior art methods have provided and that is that it removes the roots which are the primary source of renewal of the growth cycle.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for removing weeds from the bottom of a body of water, comprising:
   (a) a buoyant raft,
   (b) a motor-driven pump mounted on the raft, the input of the pump receiving water from the body of water,
   (c) an ejector mounted on the raft and having a nozzle that receives water from the pump,
   (d) a hose extending from the ejector to the said bottom,
   (e) a tray mounted on the raft and having a smooth inner surface for receiving the discharge from the ejector at one end and directing the mixture of water and weeds to the opposite end of the tray, and
   (f) collecting means mounted on said opposite end of the tray to receive and separate said mixture of water and weeds and to retain the weeds.

2. Apparatus as recited in claim 1, wherein the tray consists of a bottom and two sides, but is open upwardly and at the discharge end.

3. Apparatus as recited in claim 1, wherein the collecting means includes a bag formed of mesh material.

4. Apparatus as recited in claim 3, wherein a rigid bail is fastened to the discharge end of the tray and the open end of the bag is locked around the bail and the said end of the tray.

5. Apparatus as recited in claim 4, wherein the said open end of the bag is provided with an elastic element that tightly locks around the bail and tray.

* * * * *